Sept. 27, 1932.   E. D. TILLYER ET AL   1,879,833
EYE TESTING DEVICE
Filed Jan. 25, 1930
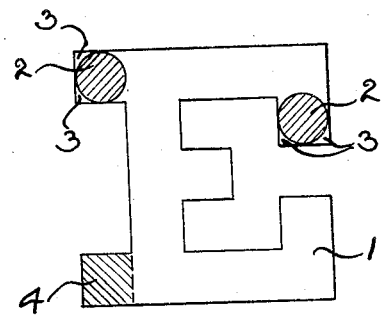
PRIOR ART
FIG. I
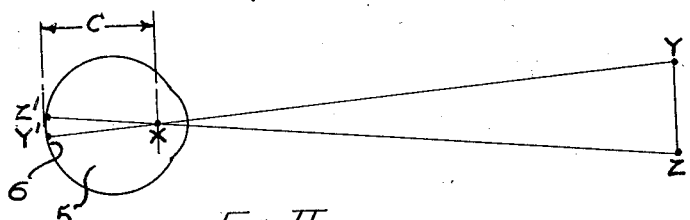
FIG. II
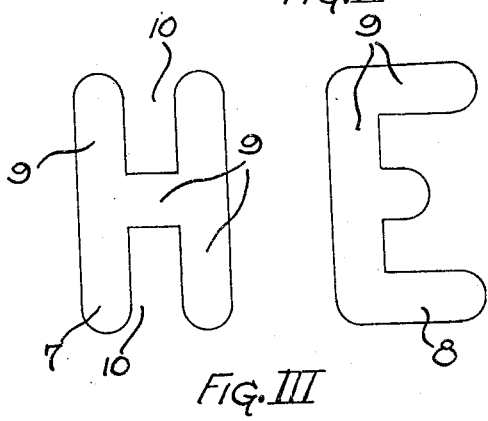
FIG. III
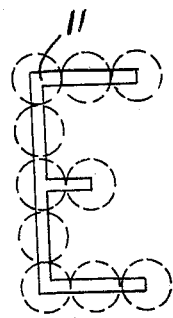
FIG. IV
INVENTORS
E.D.TILLYER & C.H.POND
BY Harry H. Styll
ATTORNEY Patented Sept. 27, 1932

1,879,833

UNITED STATES PATENT OFFICE

EDGAR D. TILLYER AND CHARLES HORACE POND, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

EYE TESTING DEVICE

Application filed January 25, 1930. Serial No. 423,341.

This invention relates to improvements in eye-testing devices and has particular reference to an improved form of test-character and to the method of testing and determining the visual powers.

The principal object of this invention is to increase the efficiency and accuracy of eye-testing procedure by providing test-characters having an outline shape based upon the circle of confusion of the normal eye.

Another object of the invention is to provide said improved form of test-character in order that tests may be conducted precisely as heretofore, but with greater accuracy.

Another object of the invention is to provide test-characters of such outline shape that the eye will readily distinguish between them until reaching the limit of clear vision, thus indicating the exact point where clear vision ends.

Other objects and advantages will become apparent from the following description taken in connection with the accompanying drawing and it will be understood that many changes may be made in the details of construction, arrangement of parts and steps in the process without departing from the spirit of the invention as expressed in the accompanying claim. We, therefore, do not wish to be limited to the exact details shown and described as the preferred forms only have been shown by way of illustration.

Referring to the drawing:

Fig. I is a front view of a prior art form of test-character.

Fig. II is a diagrammatic view illustrating the features of the invention.

Fig. III is a front view of the improved form of test character.

Fig. IV is a front view of a modified form.

For many years it has been practically universal to use test-characters for testing the visual powers of the eyes based upon the well-known Snellen types. These types are square block letters so made that the size of each part of the letter is one-fifth part of the size of the whole. The whole letter is of such size that at a certain specified distance from the eye it will subtend an angle of five minutes at the nodal point of the said eye and each part of the letter will therefore subtend an angle of one minute. The spaces between the parts of the letter are also made to subtend an angle of one minute as this is the space at which two points will be seen distinct from one another by the normal eye.

The underlying theory of the foregoing description is accepted as correct and is also used in this invention to govern the general size of the characters. However, Snellen's types, as stated, are of square block letter form and we have found that this form is not the correct one when considered in relation to the true shape of the image which each point of a test character will form on the retina of an eye under test. This shape is a circle having a diameter equal to the size of one of the parts or one of the spaces which subtend an angle of one minute at the nodal point and is known as the circle of confusion.

In the prior art the true shape of this point was ignored and the characters were made with rectangular parts or limbs which detracted seriously from the accuracy of the tests. It will readily be seen that in a test to determine the true visual power it is very important that the practitioner know exactly when the limit of clear vision has been reached and if the test characters themselves are formed so that they become indistinguishable one from another at a certain point from their own poor design and not from the patients' lack of visual power it will be an inaccurate test instead of an accurate one.

It is the prime object of our invention, therefore, to base the design of our improved test-characters upon the true shape of the image or upon the circle of confusion and so lend greater accuracy to the tests conducted to determine the visual powers.

Referring to the drawing wherein similar characters of reference denote corresponding parts throughout the several views, we have shown in Fig. I a prior art form of test character 1 which has a square block form. The shaded circles 2 represent the circle of confusion of a normal eye and it will be seen that the terminal ends of the limbs of the character 1 the circles do not conform to the outline shape of the character, but projecting portions 3 are left around the edges. It will readily be seen that if the circle 2 were a rectangle 4 these projections 3 would disappear and no trouble be experienced with the square block character 1. However, the true shape is a circle 2 and so projections 3 are left at all the terminal ends of each character used. This causes the patient to find great difficulty in distinguishing between one character and another as soon as he nears the limit of his visual power and obviously does not permit him to reach the true limit as he would do if the characters themselves were designed to help rather than hinder.

In Fig. II we have shown a diagram which illustrates the considerations governing the design of our improved test-characters. The point X represents the nodal point of the eye 5 which is approximately fifteen millimeters from the retina 6. The test character is bounded by the point Y and Z and the visual angle of five minutes is therefore YXZ. The test character and image Y' Z' subtend the same angle at the nodal point X and the retinal image formed under the angle is therefore a circle bounded by the points Z' Y'. The diameter of each limb and the space between adjacent limbs is equal to an arc of one minute on the same circle which is the limit of vision for the normal eye due to the size of the retinal cones.

In Fig. III we have shown our improved form of test character based upon this circle of one minute diameter. The characters 7 and 8 are formed by moving a circle of constant diameter over the character outline, the circle corresponding to the circle of confusion of the normal eye. The extremities of the characters are rounded and not square as in the prior art so that the eye will not be handicapped by projections at the edges and will be able to clearly distinguish one letter from another up to the limit of visual power. The limbs 9 and spaces 10 are equal in size and subtend an angle of one minute at the nodal point X of the eye. It is this angle, subtended at the nodal point by the limbs 9 of the characters and the spaces 10 between them which determines whether they be recognized.

In a modified form of the invention shown in Fig. IV we may allow the eye to make its own confusion circle instead of outlining a character to the exact size thereof.

In this form we utilize a test character 11 having a bright and narrow outline which when the eye views it will cause much the same effect as if a character such as 7 or 8 were to be used.

In the use of this device a series of test characters of different sizes but all formed upon our improved basis are exposed on a chart to the patient at a predetermined distance. This distance may be the usual 6 meters or 20 feet as in the past and the patient is asked to name the different sized letters in diminishing order. As the limit of vision is reached it is now possible to determine accurately the exact point at which the characters can be distinguished by the eyes as the characters remain clear-cut and legible to the end of clear vision. The line of characters which is finally legible is then taken to form a fraction similar to the well-known Snellen fraction and it will be seen that in all respects the procedure is just as is used when employing the prior art forms of type. If at 6 meters, number 20 is the smallest line which can be distinguished then vision equals 6/20, that is, the eye can only read at 6 meters what a normal eye would read at 20 meters.

In both of the forms of improved test characters it will readily be seen that the eye is helped to attain its limit of clear vision instead of being hindered and that true scientific principles have been utilized upon which to base the invention. The accuracy of the tests will therefore be greatly improved and the misleading results hitherto obtained entirely eliminated.

From the foregoing it will be seen that we have provided simple means of overcoming the present drawbacks associated with eye-testing devices and it will be understood that the practitioner moreover does not have to change his methods in any way in order to utilize the improved form of character.

Having described our invention, we claim:

A device of the character described comprising a test character having component parts and spaces therebetween, said parts and spaces subtending an angle of one minute at the nodal point of an eye and which when viewed by a normal eye will correspond in size to the movement of the circle of confusion thereover.

EDGAR D. TILLYER.
CHARLES HORACE POND.